Nov. 8, 1932.  C. J. BASSLER  1,886,364
DISPLACEMENT METER
Filed Feb. 28, 1929    3 Sheets-Sheet 1
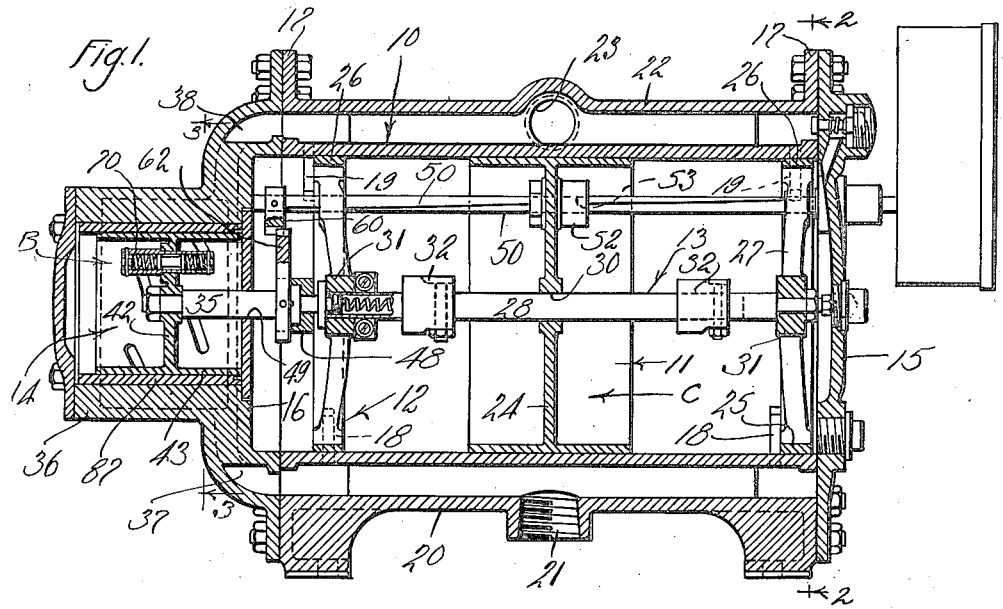
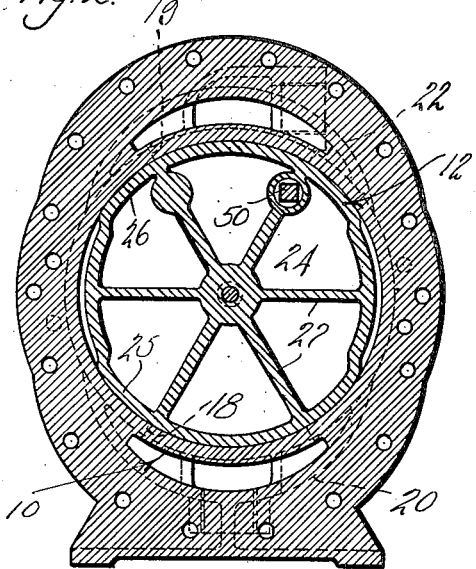
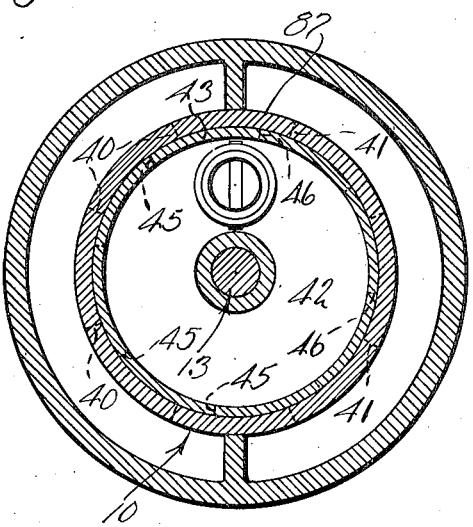
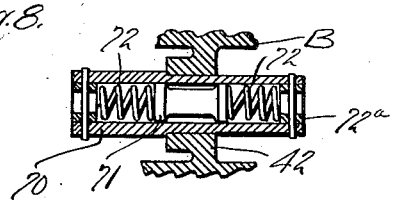
Inventor
Carlos J Bassler
by
his Attorney Nov. 8, 1932.  C. J. BASSLER  1,886,364
DISPLACEMENT METER
Filed Feb. 28, 1929  3 Sheets-Sheet 2
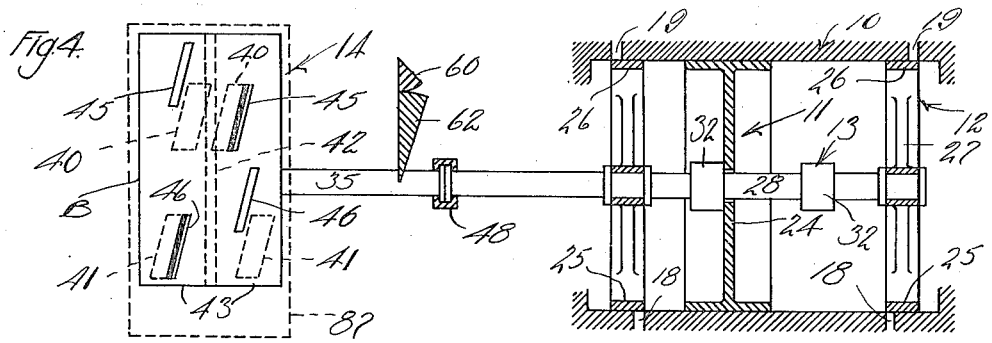
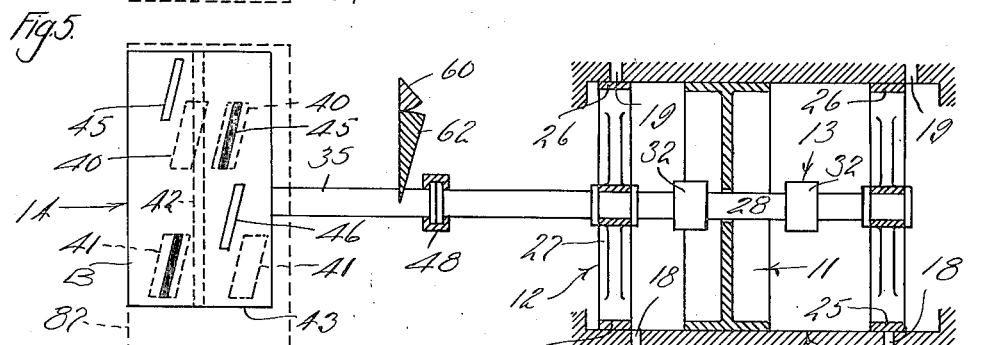
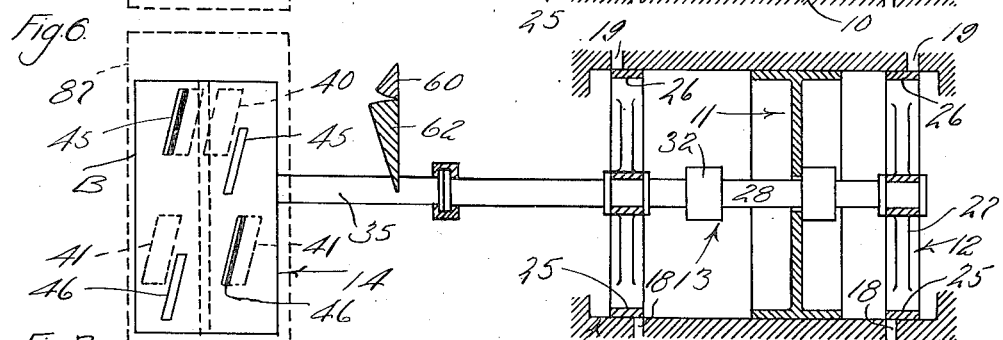
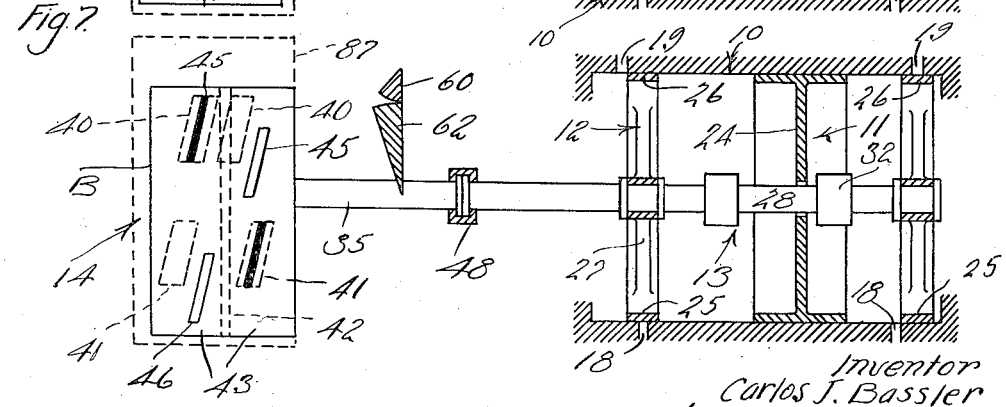
Inventor
Carlos J. Bassler
by W. Alleahwell
His Attorney

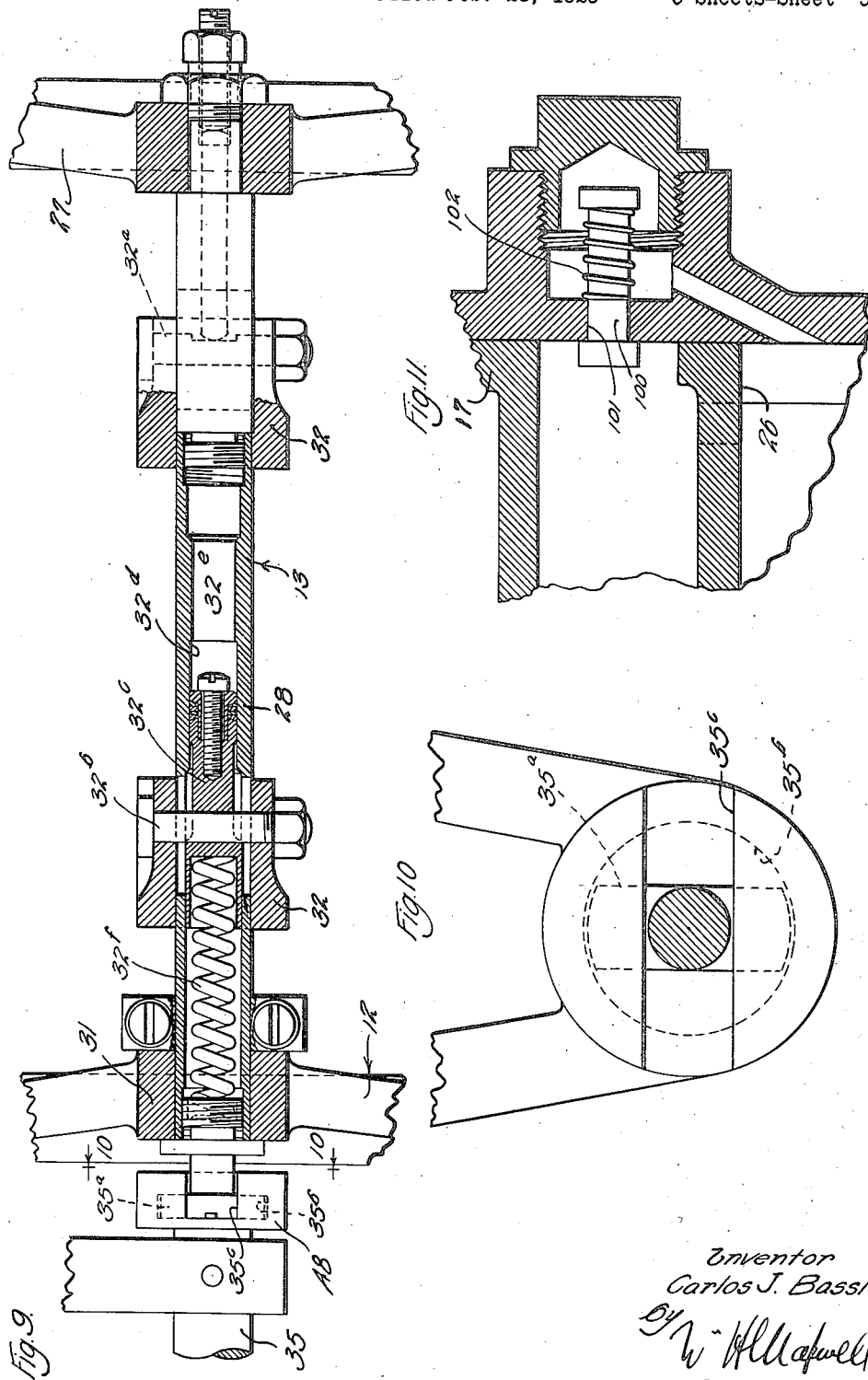

Patented Nov. 8, 1932

1,886,364

UNITED STATES PATENT OFFICE

CARLOS J. BASSLER, OF ALHAMBRA, CALIFORNIA, ASSIGNOR TO AMERICAN LIQUID METER COMPANY, OF ALHAMBRA, CALIFORNIA, A CORPORATION OF WASHINGTON

DISPLACEMENT METER

Application filed February 28, 1929. Serial No. 343,422.

This invention has to do with a meter and it is a general object of the invention to provide an improved, simplified, and accurate meter particularly useful for measuring liquids.

It is a general object of the present invention to provide improvements in a meter of the displacement type, that is, a meter which literally measures the liquid itself rather than some function of or reaction from the liquid. The meter embodying the invention is positive and accurate in action and includes simple, dependable, features of construction.

It is a primary object of the present invention to provide a meter of the general type referred to which operates automatically upon liquid being circulated through it and which is not subject to stopping on dead center.

A particular object of the invention is to provide means in a device of the character mentioned operable to effectively and dependably control the action of the movable metering element without leaving openings to cause inaccuracies in the measurement by the meter.

It is further an object of the present invention to provide a meter of the type above mentioned having valve means controlling the flow of liquid to and from the cylinder and including auxiliary control means operable to reverse the action of the movable metering element so that the valve means may be constructed without lead.

The various objects and features of my invention will be best and more fully understood from the following detailed description of a typical form and application of the invention, throughout which description reference is had to the accompanying drawings, in which:

Fig. 1 is a longitudinal detailed sectional view of the meter provided by the invention showing the piston in mid-position in the cylinder and the parts positioned for movement of the piston to the left in the figure. Fig. 2 is a detailed transverse sectional view of the main part of the meter being a view taken as indicated by line 2—2 on Fig. 1. Fig. 3 is an enlarged detailed transverse sectional view of the auxiliary valve actuating means being a view taken as indicated by line 3—3 on Fig. 1, and Figs. 4 to 7, inclusive, are diagrammatic views illustrating the various positions of the parts during operation of the meter, Fig. 4 is a view indicating the positioning of the parts at the time the piston reaches the left-hand end of its stroke and has operated to move the main valve means to dead center, and indicating the positioning of the auxiliary valve actuating means in which the valve parts have lead sufficient to cause further actuation of the main valve means beyond dead center to reverse the mechanism. Fig. 5 is a view showing the auxiliary valve actuating means operated from the position shown in Fig. 4 and the main valve means actuated past dead center so that it is reversed and the piston is in action moving toward the right-hand end of the cylinder. Fig. 6 is a view showing the piston at the right-hand end of the cylinder with the main valve means moved to the dead center position and the auxiliary valve actuating means positioned with lead to cause movement of the main valve means past dead center. Fig. 7 is a view showing the auxiliary valve actuating means operated from the position shown in Fig. 6 and the main valve means completely operated past dead center so that the piston is in operation moving toward the left-hand end of the cylinder. Fig. 8 is an enlarged detail section of a part of the auxiliary valve actuating means. Fig. 9 is an enlarged longitudinal detail sectional view of the valve rod. Fig. 10 is an enlarged sectional view taken on line 10—10 on Fig. 9. Fig. 11 is an enlarged detail sectional view of a part of the mechanism.

The principles of construction and combination of parts provided by this invention are capable of wide variation and of embodiment in various forms. For the purpose of facilitating an understanding of the invention, I will confine the present disclosure to one typical form and application of the invention, it being understood that the broader features of the invention are not to be construed as limited by details herein set forth.

The meter illustrated is of the cylinder and piston type and includes, generally, a measuring cylinder 10, a piston 11 operable in the cylinder, valve means 12 controlling the flow of liquid to and from the cylinder, means 13 whereby the valve means is operated by or from the piston 11, and auxiliary valve actuating means 14 operable to carry the valve means past or beyond the dead center position to which it is moved by the piston to give it lead so that the mechanism reverses the direction of action.

The cylinder 10 is made of suitable dimensions and is closed at its ends by heads 15 and 16. In the particular construction illustrated the heads 15 and 16 are secured to the main portion or body of the cylinder through flange connections 17. The meter provided by the invention is double acting, that is, it operates to measure fluid in both ends of the cylinder, and therefore is provided with means for circulating fluid to and from the cylinder at both ends of the cylinder. In the construction shown the main portion or body of the cylinder 10 is provided adjacent its ends with inlet ports 18 and outlet ports 19. In the particular formation of parts shown in the drawings the ports are in the form of slots cut in or through the wall of the cylinder communicating with manifolds at the exterior of the cylinder. An intake manifold 20 is formed on the exterior of the cylinder and has an opening 21 to receive liquid from a suitable supply pipe, or the like. The intake manifold extends to both ends of the cylinder where it is in communication with the inlet ports 18. The outlet manifold 22 is formed on the exterior of the cylinder separate from the intake manifold, for instance, it may be diametrically opposite the intake manifold as shown in the drawings. The outlet manifold has an outlet opening 23 through which the measured fluid may discharge from the meter and extends to the ends of the cylinder where it communicates with the outlet ports 19.

The piston 11 is slidably mounted in the cylinder and has a center or web 24 which completely separates the two ends of the cylinder.

The valve means 12 provided for controlling the flow of fluid to and from the ends of the cylinder may be of any suitable construction or type. In the case illustrated, where the cylinder has ports 18 and 19 in its wall adjacent each end, it is advantageous to provide slide valves 25 and 26 in the ends of the cylinder to cooperate with the ports 18 and 19, respectively. The valve parts 25 slidably fit the interior or wall of the cylinder and are adapted to slide longitudinally in the cylinder to open and close the ports 18. The valve parts 26 may be of similar construction. The valve parts 26 are arranged to open and close the ports 19. The valve parts 25 and 26 at each end of the cylinder are adapted to move together, or in unison, and therefore I have shown them connected through suitable ribs 27.

The valve parts 25 and 26 are connected together and related to the ports 18 and 19 so that the valve means can be positioned with the inlet port 18 open and the outlet port 19 closed, or the outlet port open and the inlet port closed. The former positioning of parts is shown at the right in Fig. 1 while the latter is shown at the left in Fig. 1. Further, in accordance with the invention, the valve means just described is such that the valve parts have a dead center position, that is, a position where both the inlet and outlet ports are closed. In accordance with the present invention, the means 13 operatively connects the piston 11 with the valve means to move the valve means to the dead center position, while the auxiliary valve actuating means 14 operates to move the valve means beyond this dead center position. The dead center positioning of the valve means 12 is where the valves are positioned so that the ports are closed or balanced so that the piston will not move in either direction. This positioning of the valve means is indicated in Figs. 4 and 6 of the drawings.

The means 13, which operatively connects the piston 11 with the valve 12, includes a valve rod 28 arranged in the cylinder and extending through the web 24 of the piston 11. The valve rod slidably fits an opening 30 formed through the web of the piston and has its end portions connected to the ribs 27 which carry the valve parts 25 and 26. In the construction shown the valve stem is rigidly connected with the ribs 27 through hub parts 31 to which the ribs are attached.

The valve rod 30 is operated from or by the piston through cooperation of the piston and stops 32 on the valve rod. There is a stop 32 on the valve rod at each side of the piston and the parts are related so that the web of the piston engages the stops to move the rod and thus in turn move the valve parts 25 and 26. For instance, as the piston is moved to the left in the cylinder, the web of the piston engages the stop at the left-hand side of the piston, moving the valve rod to the left until the valve means 12 reaches the dead center position indicated in Fig. 4 of the drawings. In a like manner, when the piston is moving to the right, the web 24 engages the stop at the right of the piston moving the valve rod to the right so that the valve means is moved to dead center position, as indicated in Fig. 6 of the drawings. It will be obvious that the spacing of the stops 32 on the valve rod governs the stroke or movement of the piston in the cylinder and, therefore, by adjusting or varying the spacing of the stops, the capacity of the meter is varied. In carrying out the present invention I may use a valve rod 28 in which the spacing of the stops is automatically adjusted to compensate for variations in temperature of fluid being handled so that the meter accurately measures by mass as distinguished from volume. In the construction shown one of the stops 32 is fixed on the rod 28 by a cross pin $32^a$. The other stop is slidable on the rod and carries a cross pin $32^b$ which connects with a plunger $32^c$ slidably mounted in a bore $32^d$ in the rod 28. The bore $32^d$ forms a chamber $32^e$ which is filled with fluid, and a spring $32^f$ engages the plunger to urge it against the fluid. The automatic valve rod referred to is the subject of my copending application entitled Meter, Serial Number 410,991, filed Dec. 2, 1929.

The auxiliary valve actuating means 14 is operable to carry the valve means 12 past dead center, that is, past the positions to which the valve parts are operated by the piston 11 to give the valve means 12 lead so that the mechanism reverses. The auxiliary valve actuating means 14 may vary in construction and formation, it being preferred to make it in the form of a cylinder and piston mechanism operable by the pressure of fluid being measured by the meter. In the form of the invention illustrated the auxiliary valve actuating means 14 is arranged at one end of the meter, that is, adjoining one of the heads of the cylinder 10 and is connected with the working parts of the meter by a valve rod extension 35. The means 14 may include a cylinder 87 carried by or projecting outwardly from the cylinder head 16, a piston operable in the cylinder, and various other features of construction as will be hereinafter described.

The cylinder 87 of the auxiliary valve actuating means is preferably arranged to be coaxial with the cylinder 10. In the arrangement shown the cylinder 87 is provided in an extension 36 formed on the cylinder head 16, the extension being provided with an inlet manifold 37 communicating with the manifold 20 and an outlet manifold 38 communicating with the manifold 22. A pair of ports is provided in the cylinder at each end, that is, in the wall of the cylinder at opposite sides of its center. Each pair of cylinder ports includes what I will term an inlet port 40 communicating with the inlet manifold 37 and an outlet port 41 communicating with the outlet manifold 38.

The piston B, which operates in the cylinder 87, is a combination piston and valve. This piston includes a web-like body 42 and annular flanges or sleeves 43 projecting in opposite directions from the body 42 and slidably fitting the cylinder 87. The sleeve parts 43 of the piston B are comparatively long and extend over the ports 40 and 41 in the cylinder. Each sleeve 43 is provided with ports 45 and 46 adapted to cooperate with the ports 40 and 41, respectively, at the corresponding end of the cylinder 87. The ports in the cylinder and piston sleeves are related so that the outlet ports 41 and 46 at one end of the cylinder register, or are in communication, when the inlet ports 40 and 45 at the other end of the cylinder are in communication. This valve arrangement has a dead center position, that is, a position where all of the valves are closed, and it is such that both the inlet and outlet ports at the same end of the cylinder are never open at the same time. This relative positioning of ports will be obvious from the diagrams in Figs. 4 to 7, inclusive.

The valve rod extension 35 operatively connects the valve rod 28 and the piston of the means 14 so that they move together longitudinally. The extension 35 is connected with one end of the rod 28 through a connection 48 which allows the extension 35 to rotate relative to the rod 28 and projects through an opening 49 in the cylinder head 16 so that it projects into the cylinder 87 to attach to the piston B within the cylinder 87. The connection between the rod 28 and extension 35 may be made by a head $35^a$ on the extension 35 operating in a socket $35^b$ at the end of the extension. The socket has a notch $35^c$ cut across it forming an opening through which the head may be passed into the socket. When the head is in the socket it is turned as shown in Fig. 10 so that it will not become displaced from the socket but will allow some rotation between the rod and extension.

The auxiliary valve actuating means 14 is provided primarily to give lead to the valve means 12 when the piston 11 reaches the ends of its stroke and has moved the valve means 12 to dead center. It will therefore be apparent that the valve arrangement in the means 14 must be such as to have lead when the valve means 12 reaches dead center with the piston at either end of the cylinder 10. For the purpose of giving the valve construction of the means 14 the desired lead and of reversing the lead of the valve means, the ports 40 and 41 and the ports 45 and 46 are pitched or diagonally disposed in the cylinder and piston, respectively, so that their cooperative relationship is varied by relative rotation between the cylinder 87 and the piston within the cylinder. The pitching of ports and the manner in which relative rotation between the cylinder and piston causes variation in the cooperative relationship of the ports will be clearly understood from examination of Figs. 4 to 7.

In the form of invention under consideration I provide means for rotating the piston B within the cylinder 87 to accomplish the desired variation in the cooperative relation of the ports. The rotation of the piston B within the cylinder 87 is preferably in the nature of an oscillation of the piston rather than a continuous rotation. For the purpose of rotating or oscillating the piston within the cylinder 87 I provide a suitable driving connection between the piston 11 and the piston within the cylinder 87. In the particular construction illustrated I provide a shaft 50 which is oscillated by reciprocation of the piston 11 and I provide a gear drive between the shaft 50 and the rod extension 35.

The shaft 50 is shown rotatably carried between the heads 15 and 16 of the cylinder 10 so that it extends through a block 52 in the web 24 of the piston 11. The desired oscillation of the shaft 50 may be obtained by suitably relating the shaft and the block 52, for instance, the shaft 50 may be polygonal in cross sectional configuration and the opening 53 through the block 52 which slidably passes the shaft may be of corresponding configuration, and the shaft and opening 53 made helical, or somewhat twisted. The block 52 being fixed in the piston and the shaft 50 being free to rotate, longitudinal movement of the piston 11 in the cylinder 10 causes rotation of the shaft 50, the extent of such rotation depending upon degree or amount of twist in the shaft 50 and the opening 53.

The desired drive between the shaft 50 and valve rod extension 35 may be had through a gear arrangement, for instance, a gear segment 60 may be mounted on the shaft 50 to mesh with a gear segment 62 mounted on the extension 35. The faces of the gear segments are made sufficiently long to allow the desired relative longitudinal movement between the extension 35 and the shaft 50. It will be obvious how the parts just described may be proportioned so that the stroke of the piston 11 in the cylinder 10 causes the desired rotation of the piston within the cylinder 87, it being obvious from the preceding description how this rotation shifts the relationship of valve ports in the means 14 to give the desired lead at the two ends of the stroke.

The valve arrangement within the means 14 has a dead center position which must be overcome in operating the parts between the two positions above described. To allow operation of the piston B to move the valve ports past dead center I provide means for allowing movement of the piston B without flow of fluid through the ports. In the particular arrangement shown I provide an opening through the piston B and I close the opening by a piston 71 operable in the opening. The opening through the piston may be formed by mounting an open ended tube 70 in the piston to extend through the body 42 of the piston. The piston 71 is slidably mounted in the tube 70 and is yieldingly held against movement in the tube by springs 72. The springs engage the ends of the piston and resist movement of the piston in either direction. The springs are arranged between the piston and rings 72ᵃ mounted in the ends of the tube. When the piston B is moved to operate the valve ports past dead center the piston 71 moves longitudinally in the tube 70 accommodating the fluid trapped in the cylinder 87. The springs 72 are sufficiently heavy to hold the piston 71 against movement in the tube 70 except when there is an excessive pressure on the fluid such as occurs when the dead center position is being overcome.

At the end of the cylinder opposite from the auxiliary valve mechanism I provide means for allowing displacement of fluid at the end of the cylinder when the valves reach dead center. I have shown a plunger 100 slidably carried in a bore 101 provided in a wall between the outlet and said end of the cylinder. The plunger has a head on each end and carries a spring 102 which normally yieldingly holds it in position to displace fluid from the space or chamber at the end of the cylinder.

From the foregoing description it is believed that the general operation of the mechanism will be fully understood. Fluid to be measured or metered is introduced into the mechanism through the opening 21 in manifold 20. This fluid enters one end of the cylinder 10, depending upon which intake valve 18 is uncovered. In the positioning of parts illustrated in Fig. 1 the fluid enters the right-hand end of the cylinder, as the port 18 at the right-hand end of the cylinder is open and the port 19 at the left-hand end is open. The head or pressure in the inlet manifold 20 is greater than that in the outlet manifold 22 and therefore the piston 11 is moved toward the left in the cylinder 10, as indicated by the arrow C in Fig. 1. During the movement of the piston 11 to the left-hand end of the cylinder the shaft 50 is rotated causing turning of the piston B in the cylinder 87. The piston 11 continues to move to the left until it has engaged the stop 32 on the left-hand end of the rod 28 and has moved the valve means 12 to dead center as indicated in Fig. 4 of the drawings. By this time the piston B in the cylinder 87 has been rotated to the position indicated in Fig. 4 and has been moved longitudinally in the cylinder to a position where the inlet ports 40 and 45 at the left-hand end of the cylinder are open and the outlet ports 41 and 46 at the right-hand end of the cylinder are open. This allows pressure from the manifold 20 to operate the piston B to the left in the cylinder 87, further opening the ports 40 and 45 at the right-hand end of the piston and the ports 41 and 46 at the left-hand end of the piston. This movement of the piston B causes the valve means 12 to be carried to the left beyond the dead center position so that the parts are related as indicated in Fig. 5. The inlet port 18 at the left-hand end of the cylinder 10 is then uncovered and the outlet port 19 at the right-hand end of the cylinder is uncovered so that the piston 11 starts operation in the opposite direction, or toward the right-hand end of the cylinder.

The piston 11 continues to operate to the right until it engages the stop at the right-hand end of the rod 28 and moves the valve means 12 to dead center. During this movement of the piston 11 the piston B is rotated to change the relationship of the ports in the means 14 so that the valve construction in the means 14 has been moved past dead center and has the inlet ports 40 and 45 at the left-hand end of the cylinder open and the outlet ports 41 and 46 at the right-hand end of the cylinder open as indicated in Fig. 6 of the drawings. Thus causes the piston B to be moved to the right, which in turn, causes the valve means 12 to be moved to the right past dead center so that the parts are positioned as indicated in Fig. 7, whereupon the fluid is admitted to the right-hand end of the cylinder 11 and moves the piston to the left in the cylinder. It is to be noted that the ports in the means 14 are such that there is no flow or passage of fluid through the means 14 to cause inaccuracy in the meter.

Having described only a typical, preferred form of my invention, I do not wish to limit myself to the specific details set forth, but wish to reserve to myself any changes or variations that may appear to those skilled in the art or fall within the scope of the following claims:

Having described my invention, I claim:

1. In a meter, a measuring cylinder having inlet and outlet ports at its ends, a piston operable in the cylinder, valves controlling flow of fluid through the ports, means positively moving the valves to dead center upon the piston reaching predetermined positions, and means operable to move the valves past dead center to give the valves lead for reversing the direction of movement of the piston.

2. In a meter, a measuring cylinder having inlet and outlet ports at its ends, a piston operable in the cylinder, valves controlling flow of fluid through said ports, means whereby the valves are positively operated directly by the piston to dead center upon the piston reaching predetermined positions, said means including a valve carrying rod adapted to be directly engaged by the piston to move the valves, and means operable to move the valves past dead center to give the valves lead for reversing the direction of movement of the piston.

3. In a meter, a measuring cylinder having inlet and outlet ports at its ends, a piston operable in the cylinder, valves controlling flow of fluid through said ports, mechanical means operated by the piston whereby the valves are operated to dead center upon the piston reaching predetermined positions, and fluid pressure actuated means operable to move the valves past dead center to give the valves lead for reversing the direction of movement of the piston.

4. In a meter, a measuring cylinder having inlet and outlet ports at its ends, a piston operable in the cylinder and having an opening, valves controlling flow of fluid through said ports, means within the cylinder whereby the valves are operated to dead center upon the piston reaching predetermined positions, said means including a valve carrying rod in the cylinder slidably passing through said opening in the piston and adapted to be directly engaged and operated by the piston and a mechanism operable to move the valves past dead center to give the valves lead for reversing the direction of movement of the piston, said mechanism including a cylinder and a piston operable in the cylinder.

5. In a meter, a measuring cylinder having inlet and outlet ports at its ends, a piston operable in the cylinder and having an opening, valves controlling flow of fluid through said ports, means within the cylinder whereby the valves are positively operated to dead center upon the piston reaching predetermined positions, said means including a valve carrying rod in the cylinder slidably passing through said opening in the piston and adapted to be directly engaged and operated by the piston and means operable to move the valves past dead center to give the valves lead for reversing the direction of movement of the piston.

6. In a meter, a measuring cylinder having inlet and outlet ports at its ends, a piston operable in the cylinder, valves controlling flow of fluid through said ports, means within the cylinder whereby the valves are operated to dead center upon the piston reaching predetermined positions, and means at the exterior of the cylinder operable to move the valves past dead center to give the valves lead for reversing the direction of movement of the piston.

7. In a meter, a measuring cylinder having inlet and outlet ports at its ends, a piston operable in the cylinder, valves controlling flow of fluid through said ports, means whereby the valves are operated to dead center upon the piston reaching predetermined positions, said means including a rod connecting the valves and extending through the piston, and shoulders on the rod to be directly engaged by the piston to positively move the rod, and means operable to move the valves past dead center to give the valves lead for reversing the direction of movement of the piston.

8. In a meter, a measuring cylinder having inlet and outlet ports at its ends, a piston operable in the cylinder, valves controlling flow of fluid through said ports, means whereby the valves are positively operated to dead center upon the piston reaching predetermined positions, and means operable to move the valves past dead center to give the valves lead for reversing the direction of movement of the piston, said last mentioned means including an auxiliary cylinder, a piston operable in the cylinder, valve means operated by the first mentioned piston for controlling operation of the auxiliary piston, and an operating connection between the auxiliary piston and the valves.

9. In a meter, a measuring cylinder having inlet and outlet ports at its ends, a piston operable in the cylinder, valves controlling flow of fluid through said ports, means whereby the valves are operated to dead center upon the piston reaching predetermined positions, said means including a rod connecting the valves and extending through the piston, and parts on the rod to be engaged by the piston to move the rod, and means operable to move the valves past dead center to give the valves lead for reversing the direction of movement of the piston, said last mentioned means including an auxiliary cylinder, a piston operable in the cylinder, valve means operatively connected with the first mentioned piston for controlling operation of the auxiliary piston, and an operating connection between the auxiliary piston and the valves.

10. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the direction of movement of the piston, said last mentioned means including an auxiliary cylinder, an auxiliary piston operable in the cylinder, valve means controlling passage of fluid to and from the auxiliary cylinder for operating the auxiliary piston, the valve means being operable to have lead for either direction of operation of the auxiliary piston, an operating connection between the auxiliary piston and valves, and means for operating the valve means to give lead to the valve means for operation of the auxiliary piston in each direction.

11. In a meter, a measuring cylinder having inlet and outlet ports at its ends, a piston operable in the cylinder, valves controlling flow of fluid through said ports, mechanical means operated by the piston whereby the valves are positively operated to dead center upon the piston reaching predetermined positions, and means operable to move the valves past dead center to give the valves lead for reversing the direction of movement of the piston, said last mentioned means including a cylinder and piston mechanism, and a valve means for the mechanism, the valve means being actuated to have lead for operating the piston of the mechanism in each direction.

12. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the direction of movement of the piston, said last mentioned means including a cylinder and piston mechanism in which the piston is operatively connected with the first mentioned piston and can be moved longitudinally and can be turned in the cylinder, and a valve means for the mechanism, the valve means being controlled by combined linear and turning movement of the piston of the mechanism in the cylinder of the mechanism.

13. In a meter, a measuring cylinder having inlet and outlet ports at its ends, a piston operable in the cylinder, valves controlling flow of fluid through said ports, means within the cylinder whereby the valves are positively operated to dead center upon the piston reaching predetermined positions, and means operable to move the valves past dead center to give the valves lead for reversing the direction of movement of the piston, said last mentioned means including an auxiliary cylinder having ports adjacent its ends, an auxiliary piston operable in the cylinder and having parts extending over the ports of the cylinder and having ports in said parts, and an operating connection between the auxiliary piston, the first mentioned piston and the valves.

14. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the direction of movement of the piston, said last mentioned means including a mechanism having a cylinder and piston movable longitudinally and rotatably in the cylinder, valve means for the mechanism operable by combined linear and rotary movement of the piston of the mechanism, and means whereby the piston of the mechanism is moved by the first-mentioned piston to operate the valve means.

15. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the direction of movement of the piston, said last mentioned means including a cylinder and piston mechanism, valve means for the mechanism operable by combined linear and rotary movement of the piston of the mechanism, a connection between the pistons whereby the first mentioned piston moves the piston of the mechanism lineally, and means operated by lineal movement of the first mentioned piston to turn the piston of the mechanism.

16. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the direction of movement of the piston, said last mentioned means including a cylinder and piston mechanism, valve means for the mechanism operable by combined linear and rotary movement of the piston of the mechanism, a connection between the pistons whereby the first mentioned piston moves the piston of the mechanism lineally, a shaft mounted for rotation, means whereby the shaft is rotated by movement of the first mentioned piston, and a drive connection between the shaft and the piston of the mechanism whereby the piston is rotated by the shaft.

17. In a meter, a measuring cylinder having inlet and outlet ports at its ends, a piston operable in the cylinder, valves controlling flow of fluid through said ports, mechanical means operated by the piston whereby the valves are positively operated to dead center upon the piston reaching predetermined positions, and means operable to move the valves past dead center to give the valves lead for reversing the direction of movement of the piston, said last-mentioned means including an auxiliary cylinder, a piston operable in the cylinder, valve means controlling operation of the auxiliary piston and having a dead center position, means whereby the last mentioned piston is operable when the valve means is in dead center position, and an operating connection between the auxiliary piston and the valves.

18. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the piston, said last mentioned means including an auxiliary cylinder, a piston operable in the cylinder, valve means operatively connected with the first mentioned piston and controlling operation of the auxiliary piston and having a dead center position, means accommodating fluid trapped in the last mentioned cylinder when the valve means is in dead center position to allow movement of the last mentioned piston, and an operating connection between the auxiliary piston and the valves.

19. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the piston, said last mentioned means including an auxiliary cylinder, a piston operable in the cylinder, valve means operatively connected with the first mentioned piston and controlling operation of the auxiliary piston and having a dead center position, a working part in the last-mentioned piston allowing movement of the last mentioned piston when the valve means is in dead center position, and an operating connection between the auxiliary piston and the valves.

20. In a meter, a measuring cylinder having inlet and outlet ports at its ends, a piston operable in the cylinder, valves controlling flow of fluid through said ports, means whereby the valves are operated to dead center upon the piston reaching predetermined positions, and means operable to move the valves past dead center to give the valves lead for reversing the piston, said last mentioned means including an auxiliary cylinder, a piston operable in the cylinder, valve means operatively connected with the first mentioned piston and controlling operation of the auxiliary piston and having a dead center position, a yielding part in the last mentioned piston allowing movement of the last mentioned piston when the valve means is in dead center position, and an operating connection between the auxiliary piston and the valves.

In witness that I claim the foregoing I have hereunto subscribed my name this 4th day of February, 1929.

CARLOS J. BASSLER.